C. P. ARMSTRONG (NOW BY MARRIAGE C. P. BILLARD).
COMBINATION LICENSE PLATE HOLDER AND DANGER SIGNAL.
APPLICATION FILED DEC. 3, 1919.
1,371,190. Patented Mar. 8, 1921.
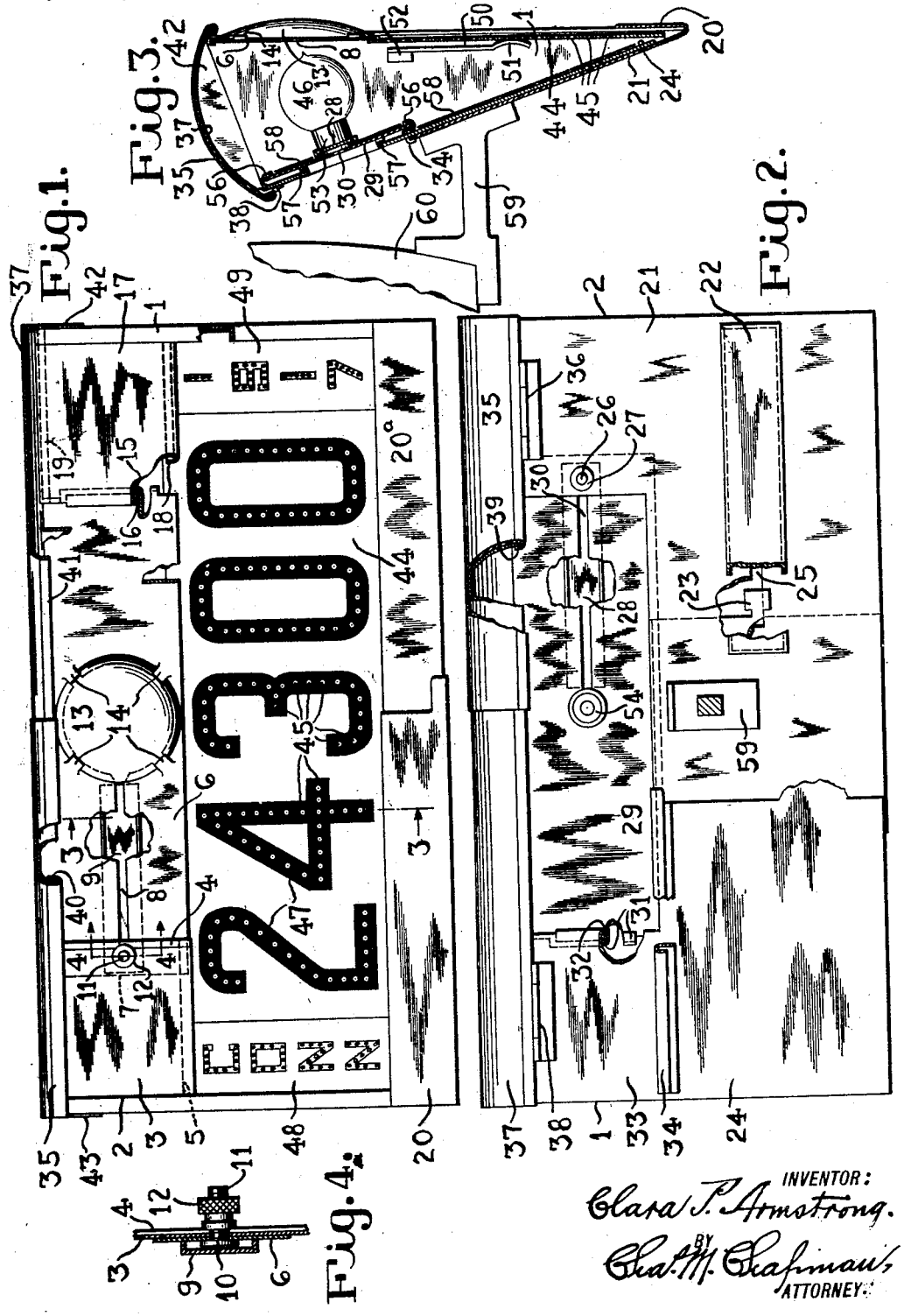
INVENTOR:
Clara P. Armstrong.
BY
Chas. M. Chapman,
ATTORNEY.

UNITED STATES PATENT OFFICE.

CLARA PRENTIS ARMSTRONG, (NOW BY MARRIAGE CLARA PRENTIS BILLARD,) OF NEW LONDON, CONNECTICUT.

COMBINATION LICENSE-PLATE HOLDER AND DANGER-SIGNAL.

1,371,190.          Specification of Letters Patent.      Patented Mar. 8, 1921.

Application filed December 3, 1919. Serial No. 342,183.

*To all whom it may concern:*

Be it known that I, CLARA P. ARMSTRONG, a citizen of the United States, residing in New London, county of New London, and State of Connecticut, have invented a new and useful Improvement in Combination License-Plate Holders and Danger-Signals, of which the following is a description.

This invention relates to apparatus for holding a license plate and signal for automobiles, and, particularly, to means adapted to hold any size license plate and to display the same fully and clearly at night as well as by daylight, and capable of being adjusted to fit any size plate.

Among the objects of my invention may be noted the following; to so construct a license plate holder that it may be adjusted within predetermined limits, so as to adapt it to receive the various license plates, differing in size, which may be required in different States; to provide a license plate holder having a front opening or window adapted to receive a license plate and display the same full length, so that said plate may have the number, the name of the State in which the license was granted and the year thereof clearly disposed in large indicia; to provide an apparatus for use on automobiles and similar vehicles by which a translucent plate may be supported and indicia thereon displayed and a signal light exhibited, the plate and signal being arranged so that the rays of light passing through the two may commingle and illuminate the face of the plate; to provide a license display apparatus, in combination with a danger or rear signal for automobiles, by which both the signal and the indicia on the plate may be readily seen at a distance in the dark, and as well in the dark as in the day-light; to provide a license holder and display apparatus with means whereby its length may be adjusted, and the adjustment held or maintained through the medium of simple means which are readily manipulated without removing the apparatus from the vehicle; to provide a combination display and signal apparatus useful at night as well as by day and having means by which the license plate and the lighting medium may be kept under cover and prevented from becoming injured, soiled or exposed during use.

With the above objects in view and others which will be detailed during the course of this description, my invention consists in the parts, features, elements and combinations thereof hereinafter described and claimed.

In order that my invention may be clearly understood, I have provided drawings wherein:

Figure 1 is a front elevation of my combination apparatus, parts being broken away to show details;

Fig. 2 is a rear elevation of the apparatus of Fig. 1, parts being broken away to show details;

Fig. 3 is a section substantially on the line 3—3 of Fig. 1 and showing also, conventionally, a means for supporting the apparatus; and Fig. 4 is a sectional detail substantially on the line 4—4 of Fig. 1.

Referring to the drawings, and particularly to Fig. 3, it will be seen that the frame of the apparatus is approximately V-shaped in cross-section and has applied thereto a cover for closing the open end of the frame. Referring to Figs. 1 and 2, the end members are indicated, respectively, at 1 and 2. The end member 2, at its upper front side, is provided with a face member 3, the inner edge of which is outwardly turned and compressed to provide a stiffened edge 4. The lower edge of the member 3 is inturned and bent upwardly, as indicated by dotted line 5, to provide a groove; and the upper edge of the member 3 is likewise inturned and bent downwardly to provide a groove similar to that indicated by 5, but not shown in Fig. 1 because it is under the flange of the cover. The opposite grooves thus provided afford guides or ways in which slides the front plate 6, which, as shown in Fig. 1, terminates at one end at the dotted line 7. The plate 6 is provided with an elongated slot 8 back of which is secured a strip 9, between which and the front plate 6 a pocket or receptacle is provided for the head 10 of a screw, the body 11 of which extends through the slot 8 in the plate 6 and through an aperture in the member 3, and upon the end of which is screwed the clamping nut 12. By this means the plate 6 is held to the member 3 in any position of adjustment of which it is capable. The plate 6, substantially in the center thereof, is provided with an aperture in which is set a red glass lens 13, affording a danger signal. This lens is shown held in place on the plate by a plurality of lugs 14 struck up from the plate: but, it will be understood that the lens may be set in place and held by any usual means, the lugs 14 being shown merely as a convenient and simple means for the purpose. At its other end, the plate 6 is provided with an outturned flange 15 providing a groove in which is set an inturned flange 16 of the upper face member 17 of the end member 1 of the frame. The flanges 15 and 16 are made to interlock, and the connection is more or less rigid, since, according to my invention, when the end member 1 and the parts carried thereby are forced to the left, viewing Fig. 1, the plate 6 is intended to move with them. At its bottom, the member 17 is provided with an inwardly and upwardly turned member 18 providing a groove, and an inwardly and downwardly turned member, indicated by the dotted line 19, also providing a groove, the upper and lower edges of plate 6 being held in said grooves.

The end member 2 is also provided with a lower face member 20, which is backwardly and upwardly turned and extended to form the back member 21, which, as shown in Fig. 2, is provided with a strip 22 forming a pocket or receptacle in which slides a flattened lug or wing 23 carried by the inner end of the back member 24 secured to the end 1 of the frame. The lug 23 extends through the elongated slot 25 in the back member 21, and thus holds the said member and the back member 24 together with capability of adjustment. The back member 24, and its face member, 20ª, are adapted to slide in the groove formed at the bend of the face member 20 and back member 21. The back member 21 is also provided with an aperture through which extends the screw 26, which has the clamping nut 27 threaded thereon, and which is also provided with a head similar to the head 10 on the screw 11,—see Fig. 4,—which slides in the pocket formed by the strip 28 secured to the inside of the back-plate 29. The screw 26 passes through the elongated slot 30 in the back-plate 29, thus permitting the adjustment of the entire end member with all its connected parts on, and relatively to, the plate 29, which, at its opposite end, is provided with an outwardly turned flange 31 coöperating with an inwardly turned flange 32 on the upper back extension 33 secured to the end member 1. The extension 33, while it may be separate from the member 24, is preferably integral therewith, and at 34 there is provided an overturned strip forming a groove, in which an upper edge of the member 21 may slide. The frame is provided with a cover, one member 35 of which is hinged to the upper extension of the back member 21, as at 36, and the other member 37 of which is hinged at 38 to the upper back extension 33. The cover members 35 and 37 are formed in the arc of a circle, and the member 37 slides within the member 35, the latter being provided with an inturned flange 39 adapted to receive the back edge of the member 37, which, for strength, may be inturned or folded over, if desired. The front of the cover member 35 is also provided with a grooved edge margin 40, in which slides the front edge 41 of the cover member 37. The outer end of the cover member 37 is provided with a down-turned member 42 and a similar member 43 is provided on the outer end of the cover member 35.

From the foregoing it will be seen that I have provided a telescopic frame, the members of which may be readily adjusted one upon the other, or relatively to each other, so as to lengthen or shorten the frame to accommodate license plates of various lengths or sizes; and, when the telescopic members have been adjusted in predetermined manner, they may be rigidly fixed in position and the adjustment held by tightening the clamping nuts 12 and 27 upon the screws 11 and 26, respectively, thus causing the parts back and front to be securely clamped together. Thus, regardless of the indicia which, in some instances, may be merely the license number, while in others may include the abbreviation of the State in which the license is granted and the year of granting of the license, and which will, of course, regulate the size of the license plate, the frame or holder can be adjusted so that the plate will be properly and rigidly held in the latter behind the front flanges of the end members, as clearly shown in Fig. 1 at the right end thereof.

The license plate 44, according to my invention, is a coöperative feature or element of the apparatus, since it is set so as to be displayed through the opening in the front of the frame, as shown in Figs. 1 and 3. Preferably, all the indicia is painted, printed or otherwise produced in solid block type or letters of a color contrasting strikingly with the suface of the plate. For example, the surface of the plate 44 may be white and the lettering black or dark blue. All the lettering or indicia are provided with lines of apertures 45 made sufficiently large to enable the rays of light emanating from the electric bulb 46, see Fig. 3, to pass therethrough freely and to such an extent as to make a thoroughly luminous outline of the indicia painted, printed or otherwise imposed upon the plate in solid or outline, as indicated at 47. Thus, all the indicia on the plate can be readily discernible at night as well as by daylight, since the painted or printed indicia will be in marked contrast to the color or body of the plate 44. Preferably, I so panel the license plate that a space 48 will be provided at one end for the abbreviation of the State in which the license is granted, and, at the other end, a space 49 for the numerals indicating the year of granting of the license. This leaves the large intermediate space for large block letters forming the license number. The plate 44 is held snugly against the front members of the frame, as shown in Fig. 1, by a pair of spring clips or holders 50, one of which only is shown in Fig. 3, and the lower ends of which are outwardly turned or bent, as at 51, to create greater tension upon the plate. The clips or arms 50 are rigidly secured in place, as at 52, by lugs fastened in any suitable manner upon the end members 1 and 2 of the frame.

The bulb 46 may be held in place at the back of the frame in any suitable manner; but, preferably, the socket 53 is secured to the plate 29, in which an aperture 54 is made, Fig. 2, through which may be extended the plug with the leads running to the battery or other source of supply in the car. The plate 29 is preferably held in grooves formed by flanged members 56 at top and bottom of said plate, and, if desired, frictional spring 57 may be interposed between the back member of the frame and the said plate to prevent rattling and jarring which might injure or fracture the filament of the lamp. Preferably, the lamp is set directly behind, and close to, the lens 13, as shown in Fig. 3, and the entire inner surface of the frame may be either coated with a reflecting substance, or a reflecting plate or plates may be applied thereto, as indicated at 58, so that the rays from the lamps will also be reflected through the apertures 45 outlining the indicia on the plate 44.

Any suitable means, conventionally indicated at 59, may be secured to the back of the frame and permanently or removably or adjustably secured to any suitable part of the automobile conventionally shown in Fig. 3 and indicated by 60, for supporting the device. In connection with the foregoing detail description it will be noted, as shown in Fig. 3, that the lens 13 is plano-convex, the convexity of the lens being outwardly extended from its supporting plate 6. The supporting plate 29 immediately behind the lens supporting plate 6 carries the source of light 46 directly behind the lens 13. The plates 6 and 29, when adjustments are made, are moved together so that the source of light 46 always retains its relation to the lens 13, and the source of light and the lens always retain substantially the same relation to the indicia plate 44. Thus the light rays passing directly through the apertures in the indicia plate 44 and certain of the light rays passing through the lens 13 commingle in front of the indicia plate with the effect of intensifying the light in front of the latter so as to clearly show up the indicia on the plate. The commingling is brought about by the light rays directly passing through the indicia plate 44 and the light rays which are refracted by the form of the lens 13 in the general direction of the indicia plate; and these results are not modified to any appreciative extent by such adjustments as may be made to accommodate indicia plates of varying sizes, as will be readily understood upon reference to Fig. 1.

From the foregoing description it will be seen that I have provided a combination signal and license display apparatus which is simple, effective for all the purposes stated, compact, strong and durable. The parts may be quickly released, adjusted and re-secured whenever it is desired to insert a license plate of different size; and the rays of light passing through the apertures outlining the indicia on the face of the plate will make the face of the sign luminous and the indicia can be readily read at a great distance, which is a very valuable feature, as will be readily understood, for traffic and State police. The provision of the danger signal in my apparatus does away with a separate tail-end lamp and economizes space and, in great measure, adds to the light thrown upon the indicia of the license plate. In fact, the rays of light emanating from the lens will aid in showing up the painted surface of the plate, thus enabling the indicia to be discerned readily. Thus a double source of illumination for the license plate is provided which aids the eye in quickly picking out the indicia on the license plate at a great distance.

Having thus described my invention, what I claim and desire to secure by Letters Patent is:

1. In combination, a telescopic frame having an opening in its face extending from end-to-end thereof, a plate with perforated indicia thereon set within the frame with its indicia exposed through the opening, a signal device carried by and exposed through the face of said frame above the plate, and a source of light within said frame arranged to illuminate said device and plate; and means for clamping the telescoping parts of the frame in any position to which they may be adjusted, whereby the frame may be adjusted to accommodate plates of different sizes without changing the arrangement of the signal device relatively to the plate or the source of light, and the latter may continue its function of illuminating both signal and plate, regardless of such adjustment.

2. In combination, a telescopic frame formed of two members substantially V-shaped in cross-section; a cover formed of two telescopic members hinged to the top of the respective frame members and movable with them; the frame having a facial opening; a plate with perforated indicia thereon set in the frame for exposure through said facial opening, and having its lower edge confined in and held by the vertex of the angle of the frame; means coöperating with the plate for holding it against the front of the frame; and means within the frame whereby the face of the plate may be illuminated.

3. In combination, a frame substantially V-shaped in cross-section, a cover hinged to the frame for closing its upper open end through which articles may be passed, said frame having a facial opening, a plate with perforated indicia thereon set in the frame for exposure through said facial opening, and having its lower edge confined in and held by the vertex of the angle of the frame; means coöperating with the plate at its opposite ends for yieldingly holding the same against the front of the frame; and means within the frame whereby the face of the plate may be illuminated.

4. In combination, a frame composed of two parts relatively adjustable, said parts being substantially V-shaped in cross-section, a cover hinged to the frame for closing its upper open end, said frame having a facial opening, a plate with perforated indicia thereon set in the frame for exposure through said facial opening, and means within the frame whereby the face of the plate may be illuminated.

5. In combination, an adjustable telescopic frame having an elongated facial opening and a second smaller opening above the same; a translucent plate with indicia thereon set in the frame for exposure through the elongated opening; a signal device in the form of a light refracting lens set in the smaller opening; a source of light within the frame adapted to visualize both the plate indicia and signal device, said source of light having a fixed relation to the signal device irrespective of adjustments, and the source of light and signal device having an approximately fixed relation to the indicia plate, whereby the exposed face of the indicia plate may be illuminated by direct rays of light passing therethrough and refracted rays of light emanating from the signal device which commingle with the direct rays in front of the indicia plate.

6. In combination, a two-part frame embodying means enabling the parts to be adjusted on each other, said frame parts having a common facial opening and a common movable cover for closing an opening through which articles may be passed, a plate set in the frame near its bottom, a signal device set in the frame near its top, the plate being provided with a plurality of series of apertures in the outline of certain indicia, and a source of light mounted in the frame near the top thereof adapted to visualize both the signal and plate.

7. In combination, an adjustable telescopic frame having a facial opening and a signal device above said opening, said opening being variable by reason of the telescopic frame, a source of light within said frame adapted to visualize the signal device and an indicia plate which may be set in the frame for exposure through the opening; and means for adjusting and holding the adjustment of the telescopic frame comprising an elongated pocket formed in one of the frame members having a longitudinal slot in one side thereof and a clamping device passing through another member of the frame through said slot and having means at its opposite ends for clamping the two parts of the frame together.

CLARA PRENTIS ARMSTRONG.